No. 632,104. Patented Aug. 29, 1899.
A. H. DINGMAN.
LUBRICATING DEVICE FOR STEAM ENGINE CYLINDERS.
(Application filed Mar. 23, 1899.)
(No Model.)
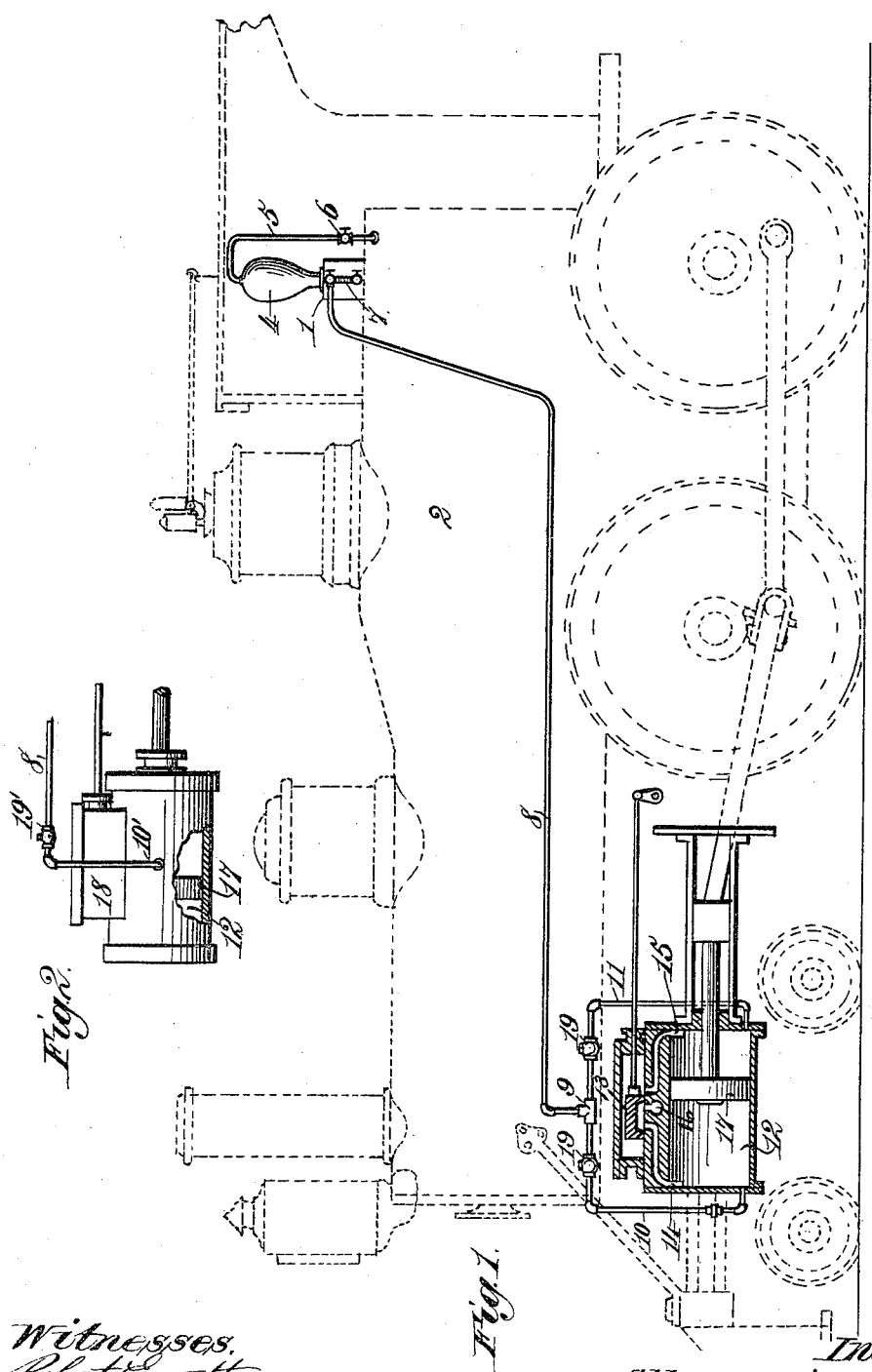
Witnesses.
Robert Everett.
L. B. Keefer.
Inventor
Allen H. Dingman.
By James L. Norris
Atty.

UNITED STATES PATENT OFFICE.

ALLEN H. DINGMAN, OF DE HAVEN, PENNSYLVANIA, ASSIGNOR OF TWO-THIRDS TO JOHN C. GRUBBS AND DAVID B. DINGMAN, OF SAME PLACE.

LUBRICATING DEVICE FOR STEAM-ENGINE CYLINDERS.

SPECIFICATION forming part of Letters Patent No. 632,104, dated August 29, 1899.

Application filed March 23, 1899. Serial No. 710,213. (No model.)

*To all whom it may concern:*

Be it known that I, ALLEN H. DINGMAN, a citizen of the United States, residing at De Haven, in the county of Allegheny and State of Pennsylvania, have invented new and useful Improvements in Lubricating Devices for Steam-Engine Cylinders, of which the following is a specification.

My invention relates to lubricating devices for steam-engine cylinders, and has for its object to provide simple and convenient means for admitting lubricant direct to an engine-cylinder instead of entering it through the steam-chest, as usual, thereby avoiding any obstruction to a proper flow of the lubricant due to balancing of pressure in the steam-chest and lubricator. Heretofore the usual way of admitting lubricant to the cylinder has been by means of a feed-pipe leading into the top of the steam-chest, whence the lubricant passes alternately through the cylinder-ports into opposite ends of the cylinder and under the main engine-valve into the exhaust-port. Ordinarily such an arrangement of lubricating feed-pipe provides for quite a perfect lubrication of the cylinders and valves at times when the engine is not working to its full capacity; but when the engine is working at full capacity the pressure in the steam-chest often becomes equal to and balances the boiler-pressure in the lubricator, thus stopping the flow of the lubricant through the feed-pipe, and consequently causing serious damage in case this condition continues for any length of time. With most lubricators of this character it is calculated that the steam admitted from the boiler will condense and that the water of condensation being heavier than the lubricant will displace the latter, thus causing it to flow from the lubricator and through the feed-pipe to the steam-chest even when the steam-pressure is balanced; but it happens that the force exerted by the water is not always sufficient to cause the lubricant to flow freely through a long feed-pipe to the engine-cylinder and therefore serious trouble results. These objections are obviated by feeding the lubricant direct to a lower part of the engine-cylinder, to pass thence to the steam-chest, main engine-valve, and exhaust, so that as the pressure is removed or decreased at opposite ends of the cylinder alternately the lubricant will flow freely from the lubricator through the feed-pipe to the engine-cylinder and valve.

In the annexed drawings, Figure 1 is a part sectional side elevation showing the application of my improved cylinder-lubricating devices to a locomotive. Fig. 2 illustrates a modification in the arrangement of a branch of the feed-pipe from the lubricator to the engine-cylinder.

Referring to the drawings, the numeral 1 designates a lubricator which in the case of a locomotive-engine may be located on the rear end of the boiler 2 at a point within the engineer's cab 3 for convenience of access. On the top of the lubricator 1 and communicating therewith there is a condensing-chamber 4, which communicates with the steam-space of the boiler through a pipe 5, for which a hand-valve 6 is provided. Any usual sight-gage 7 may be connected with the lubricator.

On each side of the boiler in the case of a locomotive there is a feed-pipe 8 leading from the lubricator to conduct lubricant to the engine-cylinders and thence to the valves. As shown in Fig. 1, the feed-pipe 8 connects by a T-coupling 9 with branch feed-pipes 10 and 11, that in turn connect with the lower part of an engine-cylinder 12 at its opposite ends. It is preferable to connect these branch pipes 10 and 11 with the cylinder-heads at a point near the bottom of a horizontally-placed cylinder, as shown. Now it will be seen that every time the main engine-valve 13 connects either cylinder-port 14 or 15 with the exhaust-port 16 and the pressure in the exhaust end of the cylinder being thereby greatly reduced there will thus be a sufficient pressure in the lubricator 1 to cause the lubricant to flow therefrom through the feed-pipe 8 and branch 10 or 11, as the case may be, to that end of the cylinder 12 from which exhaust is taking place. As the valve 13 moves back and connects the other cylinder-port 14 or 15 with the exhaust-port 16 the pressure will be removed from the corresponding end of the engine-cylinder, and the lubricant will then flow freely into that end of the cylinder through the branch feed-pipe of that end. Thus the pressure is removed alternately from the two branches of the feed-pipe at each full stroke of the piston 17, and so the lubricant flows alternately into either end of the cylinder without obstruction from any balancing of pressure, as would be liable to occur if the feed-pipe were connected to the steam-chest 18, as heretofore practiced. As the exhaust-steam passes out under the main engine-valve 13 it carries the lubricant with it, thus lubricating the surface of the valve. Consequently this arrangement of feed devices provides for a perfect lubrication of the inside working parts of the cylinder and steam-chest regardless of the working condition of the engine or the pressure of the steam. In the branch feed-pipes 10 and 11 there are placed check-valves 19 20 to prevent the working pressure of steam in either end of the cylinder from entering the opposite end or causing a back pressure in the feed-pipe. These checks are so arranged that the lubricant can pass through to the engine-cylinder, but no steam can pass back to the lubricator.

By reference to Fig. 2 it will be seen that the feed-pipe 8 may, if desired, be made to enter the cylinder 12 on the side at a point 10' an equal distance from the two cylinder ends, and a single check-valve 19' will then be provided at a suitable point on the feed-pipe. The principle of operation is practically the same as already described. Whenever the piston-head 17 reaches either end of the stroke, the exhaust takes place and the pressure is removed from one end of the cylinder 15, thus allowing the lubricant to enter freely; but as soon as the piston-head passes the end of the feed-pipe at the point 10' the lubricant is stopped and will not flow into the cylinder again until the piston-head 17 reaches the end of the stroke. By this arrangement of feed-pipe, as shown in Fig. 2, the lubricant flows alternately during half the stroke, while by the arrangement shown in Fig. 1 the lubricant flows alternately during each full stroke of the piston.

The lubricating devices described can be very conveniently and economically applied to any locomotive or other steam-engine cylinder. Their successful operation does not depend on the employment of any particular form of lubricator nor any particular form of steam-engine, and a perfect lubrication is insured at all times regardless of the pressure of steam or working condition of the engine.

What I claim as my invention is—

1. The combination with a boiler, an engine-cylinder, and a lubricator in communication with the steam-space of the boiler, of a feed-pipe leading from the lubricator and directly connected to a lower part of the engine-cylinder and provided with a check-valve, whereby the feed of lubricant to the engine-cylinder is direct at all times and without any obstruction or back pressure in the feed-pipe, substantially as described.

2. The combination with a boiler, an engine-cylinder, and a lubricator in communication with the steam-space of the boiler, of a feed-pipe leading from the lubricator and provided with branches that connect directly with a lower part of the engine-cylinder at its opposite ends, and check-valves for said branches of the feed-pipe, whereby the feed of lubricant to the cylinder at its opposite ends, alternately, is direct at all times and without any obstruction or back pressure in the feed-pipe or its branches, substantially as described.

In testimony whereof I have hereunto set my hand in presence of two subscribing witnesses.

ALLEN H. DINGMAN.

Witnesses:
EDWIN P. DINGMAN,
WILLIAM H. SPEER.